US005574315A

United States Patent [19]

Weber

[11] Patent Number: 5,574,315

[45] Date of Patent: Nov. 12, 1996

[54] METHOD AND APPARATUS ENABLING EMERGENCY ACTIVATED CONTROL OF ELECTRICALLY OPERATED DOOR LOCK AND WINDOW REGULATOR SYSTEMS IN A MOTOR VEHICLE

[76] Inventor: Harold J. Weber, 560 Washington St., P.O. Box 6161, Holliston, Mass. 01746-6161

[21] Appl. No.: 373,060

[22] Filed: Jan. 17, 1995

[51] Int. Cl.[6] .......... B60R 21/09

[52] U.S. Cl. .......... 307/10.1; 180/271

[58] Field of Search .......... 307/9.1, 10.1, 307/10.6; 292/216, DIG. 65, DIG. 27; 70/237, 264, DIG. 30; 180/271, 281, 282; 280/735; 340/436, 457

[56] References Cited

U.S. PATENT DOCUMENTS

| | | | |
|---|---|---|---|
| 3,649,960 | 3/1972 | Severn | 340/457 |
| 4,381,829 | 5/1983 | Montaron | 180/282 |
| 4,785,907 | 11/1988 | Aoki et al. | 180/281 |
| 5,246,083 | 9/1993 | Graf et al. | 180/271 |
| 5,327,990 | 8/1994 | Busquets | 180/271 |

*Primary Examiner*—William M. Shoop, Jr.
*Assistant Examiner*—Richard T. Elms

[57] ABSTRACT

In event of a collision accident involving a motor vehicle having electric window regulators and power door locks, automatic and immediate door unlocking and window roll-down occurs to aid in passenger egress and emergency medical personnel access without a critical loss of time which might otherwise result in additional passenger injury and risk for the medical personnel. The electrically regulated windows may also be activated whereby their roll-down may be accomplished by operating an exterior door release handle subsequent to an accident, in lieu of automatic roll-down. Motor vehicles having inside door latch disablement setting devices, such as "child protection locks" are also "unlocked" to enable door release by a passenger from inside of the vehicle to avoid dangerous entrapment of the passenger within the damaged vehicle.

20 Claims, 4 Drawing Sheets

FIG. 3
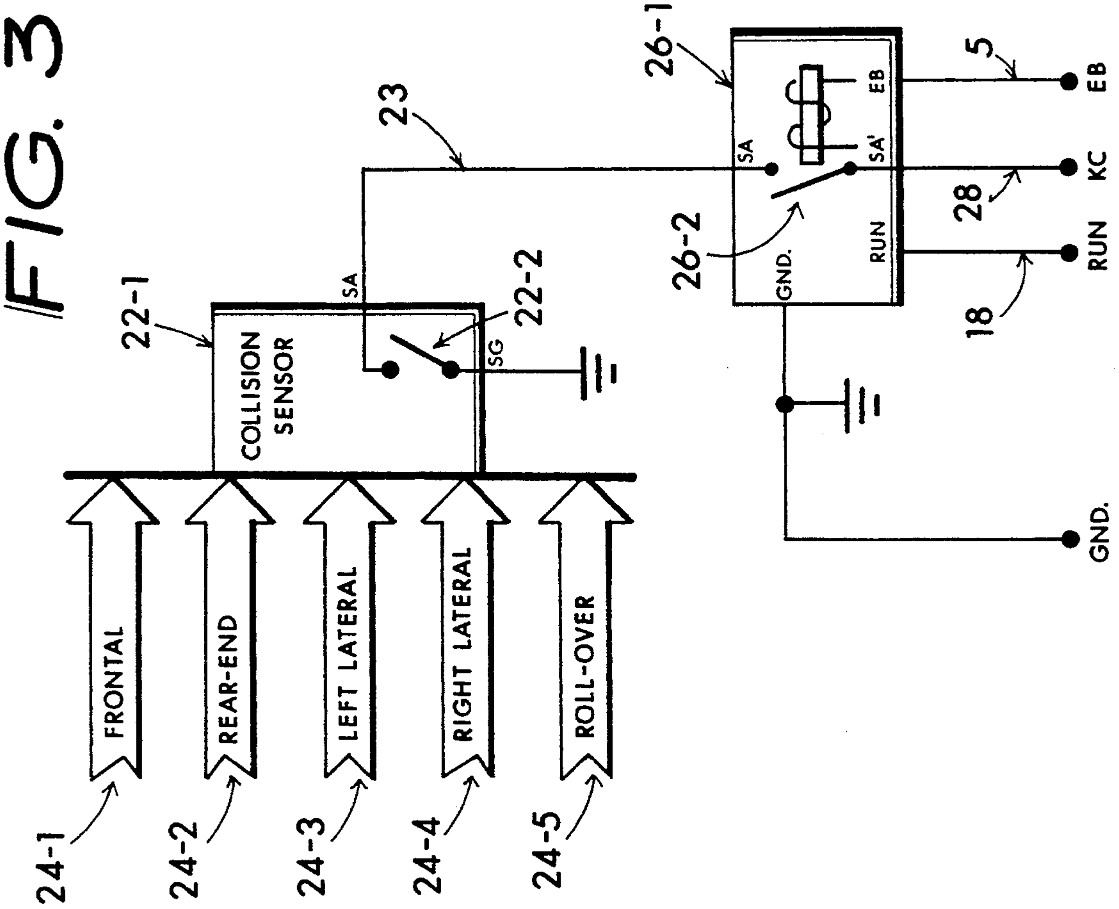
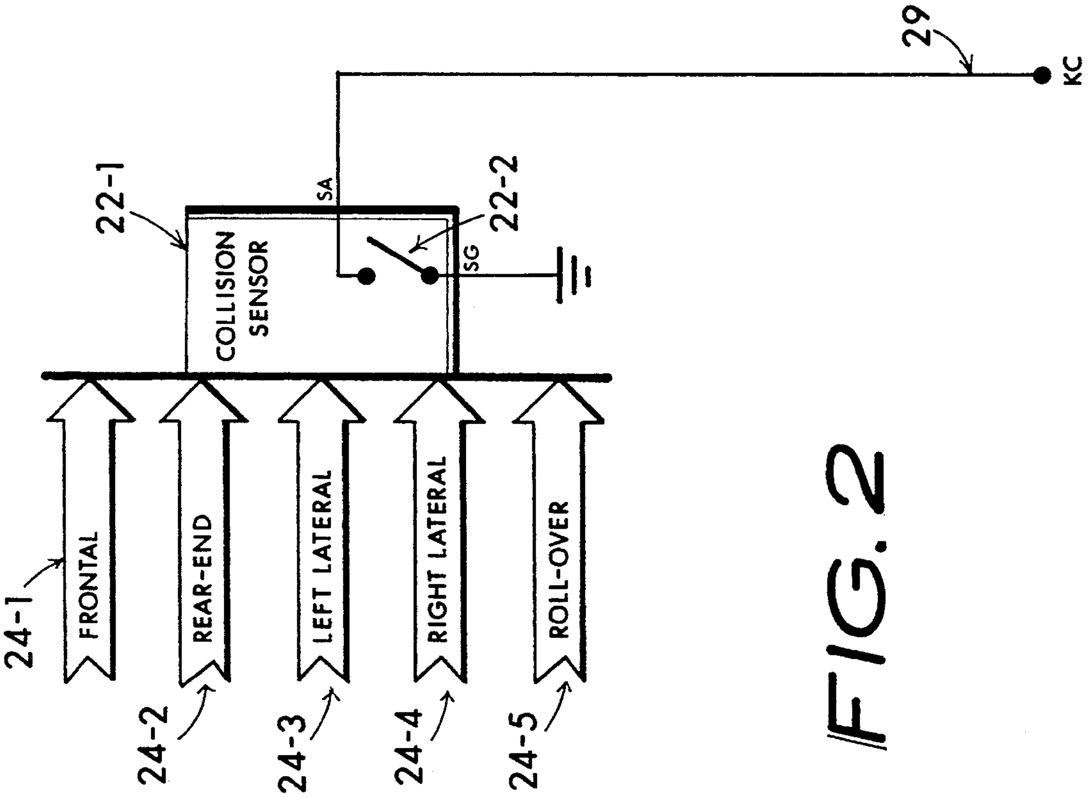
FIG. 2

METHOD AND APPARATUS ENABLING EMERGENCY ACTIVATED CONTROL OF ELECTRICALLY OPERATED DOOR LOCK AND WINDOW REGULATOR SYSTEMS IN A MOTOR VEHICLE

FIELD OF MY INVENTION

My invention relates to motor vehicles in general and in particular automobiles, trucks and vans commonly used for passenger conveyance. My invention even more particularly relates to those vehicles which are equipped with remote regulated windows and remotely controlled door locksets. In the context of this paragraph, "remote" may mean that operation of passenger position windows and door locksets might be controllable from the driver's position. In any event, the door lockset and window regulator are power operated, usually by an electric motor and gear drive mechanism, as opposed to manual operation utilizing a hand crank or pull-latch. It is not necessary that the vehicle have both provisions for the power window and the power door lock operation and substantial safety benefit can be obtained even when either feature is singularly provided. Some doors of the vehicle may also be equipped with a "child protection lock" which is ordinarily an operator (e.g., driver or adult) presettable door latch blocking device which inhibits release of so-equipped doors from inside of the vehicle and which might result in passenger entrapment in event of an accident. Overall benefit of my invention occurs when the vehicle is involved in a severe accident or collision, particularly where one or more passengers are injured and may be otherwise trapped within a locked-up and damaged vehicle. Under such an emergency condition, unopenable windows in a jammed door, or a door locked so as to prevent openability from inside (e.g., "child protection locks", etc.) may deny egress to even a mildly injured victim, while valuable time may be denied emergency personnel arriving at the accident scene due to externally locked doors and closed windows.

BACKGROUND OF MY INVENTION

Motor vehicles in general, and automobiles in particular are frequently equipped with electric window regulators capable of "remotely" opening and closing passenger windows with merely the pressing of a button actuated switch, instead of conventional "crank-up" manual operation. It is also commonplace to provide vehicles, such as automobiles, with power lock devices which are usually electrically actuated and serve to "lock up" or release all of the door lock mechanisms of a so-equipped motor vehicle. Furthermore, it is frequent practice for the operator (driver) of these kind of power lock and power window equipped vehicles to ride about with all of the doors locked and all of the windows rolled-up, particularly when the vehicle is air conditioned or the weather is bad. In fact, it is desirable to keep the windows tightly closed to reduce noise at highway speeds and also maintain locked doors to keep down the possibility for "carjacking" (forced car theft) or acts of crime in a high crime area, such as an inner-city setting.

When a collision accident occurs, the tightly locked and window sealed vehicle is virtually a pyre for anyone trapped inside if a vehicle fire occurs. If the vehicle's passenger is stunned or partially injured each moment lost in not gaining quick egress from the vehicle can potentially lead to that passenger's more severe injury or death.

Even a stunned or confused passenger might be able to grapple for a door handle and get out of a damaged vehicle. However, if the doors are preset to be inoperative from inside (e.g., "child protection locks") or the windows are set to be inoperative by a driver controlled lockout switch, there is little opportunity left for self-enabled egress by a disoriented victim.

When help eventually arrives at the scene of an accident, whether it is a layperson, a law enforcement officer or a trained medical person, it becomes imperative that an injured passenger can be quickly accessible and removable from the vehicle, particularly if a threat of fire or likelihood for explosion exists. It is also important that the passenger be given quick medical attention without the encumberance of acheiving forced entry into the vehicle, for as is well known, every second can often make a difference for the injured passenger.

Vehicles are frequently equipped with "air-bag" passenger restraint systems for the operator (driver) position and sometimes one or more passenger positions. Deployment of the air-bag device is ordinarily acheived by a variety of impact or collision sensors that measure deceleration, impact and other factors and the operation of which are well known in the art. It is the purpose of these sensors to produce a collision signal which detonates the explosive charge (or whatever other means might be elected by a designer) to splay the air bag protective device.

It is therefore feasible to take the collision signal produced by the air-bag system sensors or by other sensors operating on similar well known principles and thereby develop an "egression signal". Oftimes it is preferable that this egression signal be produced by separate sensors which are substantially more sensitive than the sensors ordinarily utilized for airbag deployment in order to enable the advantages of my invention to beneficially operate even in less severe accident situations wherein the airbag deployment might not necessarily occur. It is therefore the purpose of the egression signal producing system to respond to any substantive emergency condition involving the vehicle and provide for immediate unlocking of all otherwise locked vehicle doors and to simultaneously open (e.g., roll-down) all of the vehicle's closed windows. As a result of this automatic action, a maximal provision for immediate egress or access is provided whereby a passenger may quickly get out of a damaged vehicle, for example through the automatically opened window wherein the door may otherwise be jammed perchance when it is resting on an object such as a rock, curbing or another vehicle.

The immediate and automatic opening of otherwise closed windows and releasing of door locks also enables police, medical personnel or even laypersons quick access into a wrecked vehicle in order to quickly aid or even remove the accident victim. This ability for quick action is of particular importance when the vehicle shows a likelihood for fire, explosion or further damage from falling objects or being struck by other vehicles.

OBJECTIVES OF MY INVENTION

My invention's central object is to provide for quickly acheived emergency passenger egress from a motor vehicle in event of a collision or similar vehicle disabling accident.

Another object of my invention is to immediately and automatically unlock otherwise locked doors of a motor vehicle equipped with electric door locks in event of an emergency condition wrought by accident.

Yet another object of my invention is to immediately and automatically roll-down or open windows of a motor vehicle equipped with electric window regulators in event of an emergency condition such as a collision.

Another object of my invention is to automatically override the inhibiting effect of door release safety lockup devices (e.g., "child protection locks") in a wrecked vehicle thereby enabling passenger release of doors from within the vehicle even when the passenger is partially disoriented and irrespective of the safety lockout device setting prior to occurrance of the vehicle wrecking accident.

Still another object of my invention is to provide immediate access by emergency workers and other persons to an entrapped victim through the automatic opening of windows and unlocking of doors or other hatches of a motor vehicle in event of a vehicle disabling collision accident.

SUMMARY

My invention provides for safe egress from a wrecked motor vehicle. It also provides less inhibited (or at least less delayed) access into the vehicle by emergency personnel. In effect, locked doors of the vehicle are unlocked and closed windows of the vehicle may be opened whenever an emergency condition, such as caused by an accident, is sensed.

An emergency sensor is provided which detects vehicle impact with another object and produces an egression signal which enables electrically operated door locks to "unlock" and enables electrically regulated windows to automatically "open" or at least to be enabled to be quickly opened, even from the outside of the vehicle.

The egression signal produced by the emergency sensor provides power to the door lock system to enable immediate "unlocking" action. In addition, the egression signal also provides power to each of the window regulators (in a vehicle so-equipped with power window regulators) thereby enabling either immediate automatic roll-down (e.g., opening) of the vehicle's windows. At the very least, any intentional "lock-up" of window operation is undone so that the windows may be operated by any passenger inside the wrecked vehicle. Additionally, operation of window roll-down (e.g., opening) may be enabled external to the vehicle, such as by operating the outside door latch, etc. thereby enabling emergency personnel to quickly "open" or roll-down any closed windows in order to gain quick access.

In vehicles equipped with "child protection locks" which might be preset to block door latch operation from within the vehicle (usually used with rear doors of a 4-door style vehicle), the egression signal may immediately activate a release device thereby providing unencumbered operation of the locked-out doors by any passenger in order to provide for less encumbered egress from the vehicle.

My invention's emergency considerations are believed to be most economically and conveniently applicable to new vehicles when included at the time of manufacture but this does not preclude at least some of the advantages being added to existing vehicles as an "aftermarket" retrofit installation employing adjunctive hardware coupled with the vehicle's original hardware and existing systems for door locking, window regulation, child-proof locks, etcetera.

These and other aspects of my instant invention's improvements will become apparent to a practicing artisan through the teachings of this specification and including the drawings and claims appended thereto.

DESCRIPTION OF DRAWINGS

FIG. 2—Collision sensor having several sensory inputs for producing an egression signal.

FIG. 3—Collision sensor including timer control for limiting response time subsequent to vehicle ignition lockup during which an egression signal may occur.

DESCRIPTION OF MY INVENTION

Figure 1:
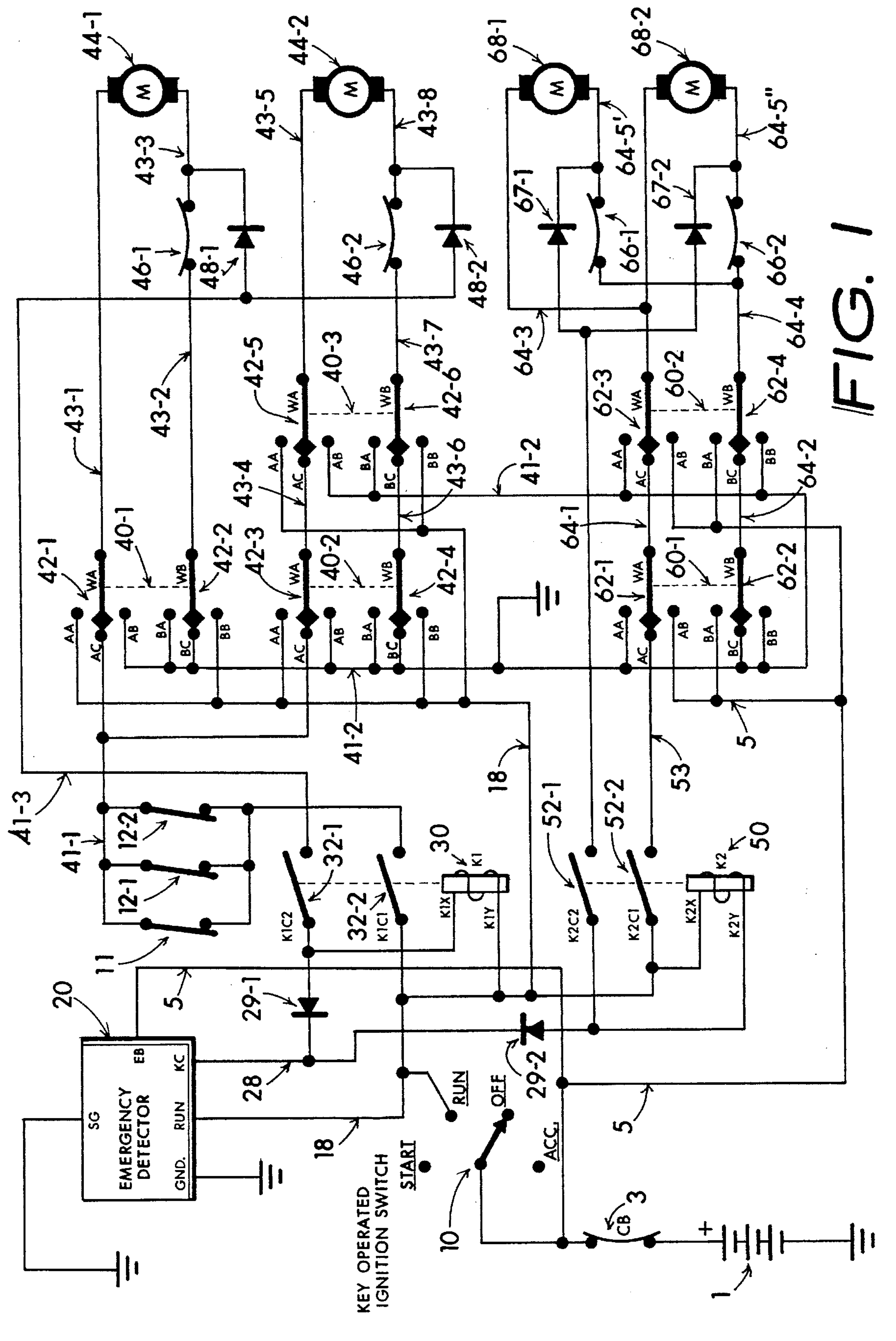
FIG. 1—Electrical diagram of motor vehicle window regulators and door locks including an emergency detector and associated circuitry to provide emergency induced automatic window opening and door lock release.

Essential elements of a vehicular wiring diagram including electrically regulated windows and electrically operated door locks are shown in FIG. 1 in conjunction with additional elements necessary to implement the essence of my invention.

A storage battery 1 couples through a circuit breaker 3 with the arm of a section of a key operated ignition switch 10 as commonly utilized in motor vehicles of all types. The ignition switch is usually provided with four operative positions: "ACCessory-OFF-RUN-START". In this particular illustrative hookup of FIG. 1, when the arm of the switch 10 is moved to the RUN position, battery power couples with line 18 and is distributed to the contact arm 32-2 of a DPST-NO relay 30 and to switch contacts "AA" on the window regulator control switches 40-1,40-2,40-3 and the contact arm 52-1 of a DPST-NO relay 50. In contemporary vehicles, the level on line 18 is usually about +12 volts DC.

Usual vehicle practice places the window control switches 40-1,40-2 and the door lock switch 60-1 near the driver while window regulator switch 40-3 and door lock switch 60-2 are most often located near the passenger position. In this shown arrangement, a two door vehicle hookup is depicted but extension to a four door hookup is well known in the art.

In usual vehicle operation and with the keyswitch 10 in the RUN position (which results in battery power on line 18), operating the window regulator switch 40-1 "upward" where the switch wiper arms WA,WB make with respective contacts AA,BA results in positive battery power on line 43-1 while line 43-2 is grounded. The regulator's MOTOR 44-1 is energized and "cranks" the window "up" or to the CLOSE position. When closed, additional current flow through the motor 44-1 trips the circuit breaker 46-1 thereby limiting any attempt for the motor to run beyond the closed position. Conversely, moving the switch wiper arms WA,WB "downward" to make respective contacts AB,BB results in line 43-1 being grounded while positive battery power flows on line 43-2 thereby reversing the action of the motor 44-1 to "crank" the regulator "down" and thereby "OPEN" the window.

When the EMERGENCY DETECTOR 20, such as an inertia sensor, senses an accident condition, establishing an emergency condition response and an emergency state signal, or egression signal, is produced which in this illustrative hookup appears on line 28 (KC terminal of the Emergency Detector 20) as at least a momentary "ground" state, This momentary egression signal, as coupled through diode 29-1 serves to energize relay 30, closing the normally open contacts 32-1,32-2. Closure of contact 32-1 couples line 41-3 with diodes 48-1,48-2 to junctures 43-3,43-8 that effectively return to ground through circuit breakers 46-1, 46-2, wipers WB and contacts BC of switches 40-1,40-2, 40-3 and grounded line 41-2. As a result, the relay 30 is electrically "latched", with contacts 32-1,32-2 remaining closed.

The closed contact set 32-2 couples the power on line 18 with parallel switches 11,12-1,12-2. When at least one of the switches 11, 12-1 or 12-2 is CLOSED, the battery power couples with line 41-1 and through contacts AC and wipers WA of switches 40-1,40-2,40-3 with window regulator drive motors 44-1,44-2. The result is that the drive motors act immediately to "crank down" or OPEN the associated windows, permitting passenger egress or emergency personnel access through the window aperture.

The circuit breakers 46-1,46-2 sense motor overload and are intended to OPEN whenever a window associated with the drive motors 44-1,44-2 is either FULLY OPEN or FULLY CLOSED, thereby preventing continued motor current draw. The usual circuit breakers are thermally operated and therefore have an OPEN period (albeit brief in duration) during which they cool down and reclose. When the windows associated with BOTH motors 44-1,44-2 are fully OPEN as automatically obtained through the closed contacts 32-2, both of the circuit breakers 46-1,46-2 will open, denying a ground return path through diodes 48-1,48-2 with the result that relay 30 is de-energized and contacts 32-1, 32-2 "drop out" or OPEN. The opening of contact set 32-1 effectively unlatches the electrically latched relay, stopping further automatic operation of drive motors 44-1,44-2.

As this shows, the windows of the vehicle may automatically OPEN whenever a momentary "ground level" egression signal appears on line 28 and switch 11 is CLOSED. An exception to this automatic operation occurs if switch 11 is OPEN and switches 12-1,12-2, if included, are also OPEN. Ordinarily when installed in the vehicle, switches 12-1,12-2 are coupled with the vehicle's exterior driver and passenger DOOR latch handles and the pressing, lifting or other physical manipulation or actuation of the door latch handle serves to CLOSE either the switch 12-1 or 12-2, whereas otherwise the switches are OPEN when the door latch handles are relaxed. What this enables is that, subsequent to the egression signal occurance on line 28 (e.g., line 28 is at least momentarily grounded by the Emergency Detector 20) and relay contacts 32-1,32-2 latch CLOSED, it is possible to couple battery power through the door latch actuated switch 12-1 or 12-2 to operate the window regulator motors 44-1, 44-2 from OUTSIDE of the vehicle irrespective of the condition of the passengers within the vehicle. In effect, a person attending the post-accident scene is not blocked from accessing the motor vehicle, but rather is able to at least open one or more windows of the vehicle.

It is obvious that the door switches 12-1,12-2 may be omitted and the switch 11 may merely be a jumper wire substituted for and emulating the CLOSED contacts function of switch 11. In this more economical embodiment, immediate automatic window roll-down occurs in event of a collision.

The (grounding) egression signal on line 28 also couples through diode 29-2 with a relay 50. The relay 50 actuates and effectively CLOSES the normally open contacts 52-1, 52-2. Contacts 52-1 couple through diodes 67-1,67-2 to lines 64-5',64-5" and therethrough circuit breakers 66-1,66-2 and wipers BB and contacts BC of door LOCK/UNLOCK switches 60-1,60-2 to ground. The closed contacts 52-2 couple battery voltage via contacts AC and wipers WA of door LOCK/UNLOCK switches 60-1,60-2 to the door lock actuator drive motors 62-1,68-2 to thereby UNLOCK each door. Almost immediately the circuit breakers 66-1,66-2 "open" when the motors 68-1,68-2 have completed their travel, thereby interrupting the relay 50 ground return sought through closed contacts 52-1 and diodes 67-1,67-2. The result is that the coil of the relay 50 is de-energized and the contacts 52-1,52-2 drop out and OPEN. In effect, the person attending the post-accident scene is also not locked out of the motor vehicle, but rather is able to at least open one or more doors of the vehicle.

The emergency detector 20 may include a collision sensor 22-1, such as an inertia sensor, as shown in FIG. 2 and including normally OPEN contacts 22-2. The sensor 22-1 is usually responsive to one or more collision stimuli, including:

| | |
|---|---|
| Frontal Impact | 24-1 |
| Rear-End Impact | 24-2 |
| Left Lateral Impact | 24-3 |
| Right Lateral Impact | 24-4 |
| Vehicle Roll-Over | 24-5 |

When any of these stimuli exceed predetermined limits, the contacts 22-2 CLOSE effectively producing the "grounded" egression signal on line 29 connected with terminal KC for operation of my invention.

Further refinement of the emergency detector 20 appears in FIG. 3 that may include the stimuli responsive collision sensor 22-1 that produces an egression signal on line 23 when an accident occurs. Referring back to FIG. 1, the relays 40,50 obtain their +Eb battery voltage through the RUN contacts of the ignition switch 10. The reason for limiting the operable period for automatic window opening and door unlocking to having the keyswitch set in the RUN position is to preclude unauthorized and intentional (e.g., illegal) access to the vehicle by "ramming" the vehicle by another vehicle and setting off the automatic egression system. In other words, the vehicle key has to be in the ignition switch and the ignition switch has to be switched to the RUN position for the automatic egression system to be made operative. In FIG. 3, a timing device 26-1 including a relay having switch contacts 26-2 provides a limited period of emergency egression system operation even after the ignition switch is switched to the OFF or ACCessory position. This enables the automatic egression system for typically a minute or so after the driver takes the key and at least starts to exit the vehicle whereby something running into the vehicle at that time will still enable enhanced egress for any remaining passengers.

Figure 4:
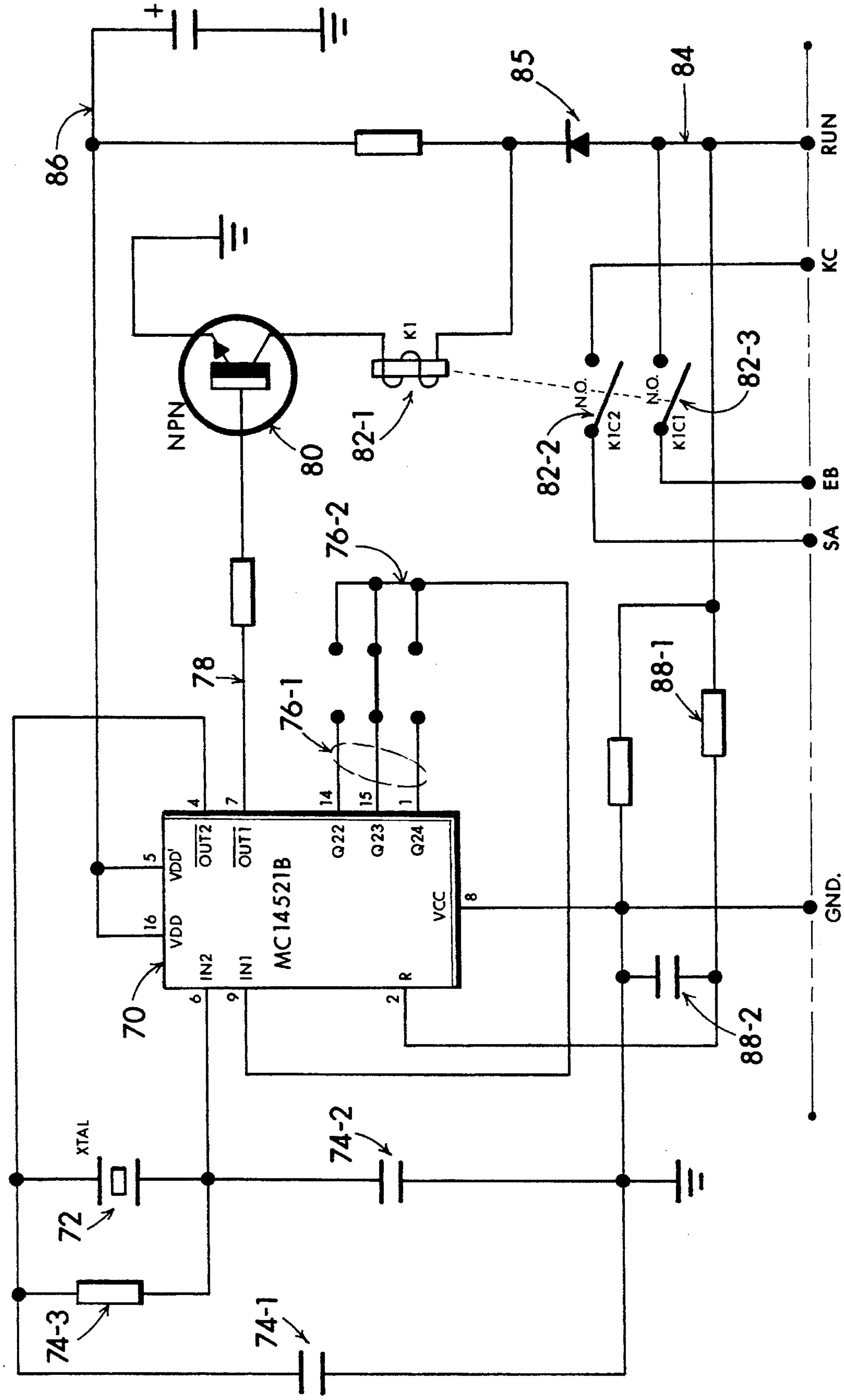
FIG. 4—Electrical diagram of a timer suitable for use with the timed collision sensor hookup.

A timer arrangement for the timing device 26-1 is shown in the electrical diagram of FIG. 4 in which a CMOS integrated circuit (counter) 70 serves to "time" the operation of a relay K1. A crystal (xtal) 72, together with capacitors 74-1,74-2 and resistor 74-3 form an oscillator for "clocking" the counter portion of the (Motorola) MC14521B device. By selecting the frequency of the crystal 72 (a 32-Khz "watch" crystal has been used for this purpose) it is possible to obtain a LOW to HIGH transistion on the output lines 76-1 after elapse of a few minutes, more or less, and using a jumper (herein shown coupled with the Q23 output, pin 15) a timed signal appears on line 76-2.

When the ignition switch is in the RUN position, a HIGH level appears on line 84 which couples through a low-pass filter 88-1,88-2 with the reset (R) input of the counter 70, resetting all counter outputs LOW. The LOW state signal on line 76-2 couples to the IN1 input inverter portion of the counter, resulting in a HIGH level on the OUT1 line 78 that couples with the base of an NPN transistor 80, turning the transistor ON and energizing the relay coil 82-1, closing the normally open contacts 82-2 (K1C1,K1C2). Contacts K1C2 complete the circuit between the SA and KC terminals, enabling the effect of the collision sensor 22-1 of FIG. 3. Concurrently, relay contacts K1C1 couple the EB terminal with line 84, thereby providing power to the door lock and window regulators as though the ignition keyswitch were still in the RUN position although the keyswitch may have been turned to the OFF position and even the key removed. As a result of this partitive override of the ignition switch, usual electrical lockup does not occur and the emergency egression system remains operative irrespective of the key-switch setting.

After elapse of a predetermined period of time preferably not more than a few minutes in duration a HIGH state signal appears on line 76-2 which, after inversion between the IN1 and OUT1 terminals of the counter 70, provides a LOW state on line 78 that effectively turns the transistor 80 OFF and the relay coil 82-1 is deenergized, dropping out the contacts 82-2. The result is that the emergency egression system is disabled. DC power for operation is obtained through diode 85, developing about +12 volts DC on line 86.

Figure 5:
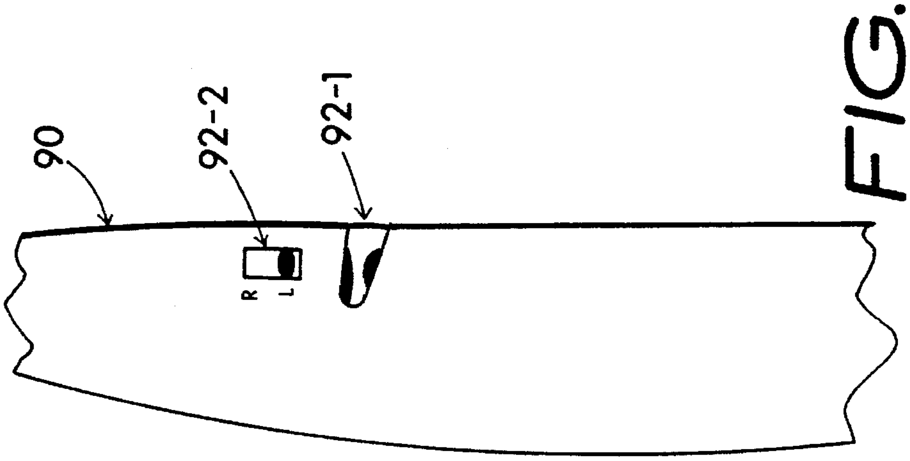
FIG. 5—Arrangement of "child protection lock" embodied in a typical vehicle door.

A representative automobile door section 90 is shown in FIG. 5 that includes the usual latch mechanism 92-1 and additionally a finger operable slide arrangement 92-2 that sets the door latch device to the "R" (release) or "L" (locked) position as is usual practice in "child protection lock" arrangements. Usually, this lockup makes the INSIDE door handles inoperable in unlatching the door, while the OUTSIDE door handles may continue to be utilized. Typically, the lockout device 92-2 is located on the edge of the door where it is obscured when the door is closed.

Figure 6:
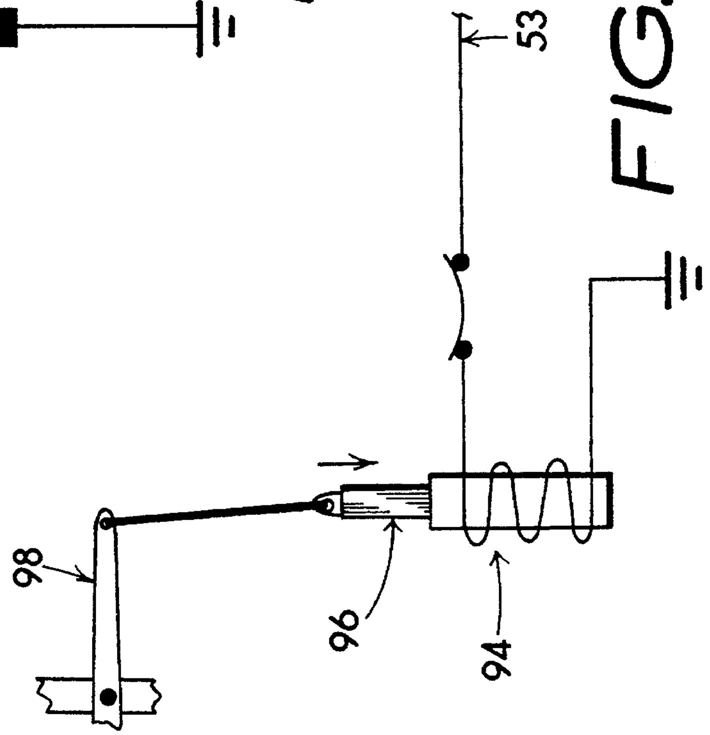
FIG. 6—Solenoid actuator for releasing child protection lock device in response to the egression signal.

In FIG. 6 a solenoid (electromagnet) 94 is depicted which has a linear armature 96 that is drawn in the direction of the arrow when the solenoid 94 is energized by coupling with line 53 of FIG. 1. The armature movement operates a lever 98 that may be linked to the child protection lock 92-2 to effectively "unlock" the child lock mechanism and resume normal door latch operation whereby the door may be opened from the inside as well as the outside.

Figure 7:
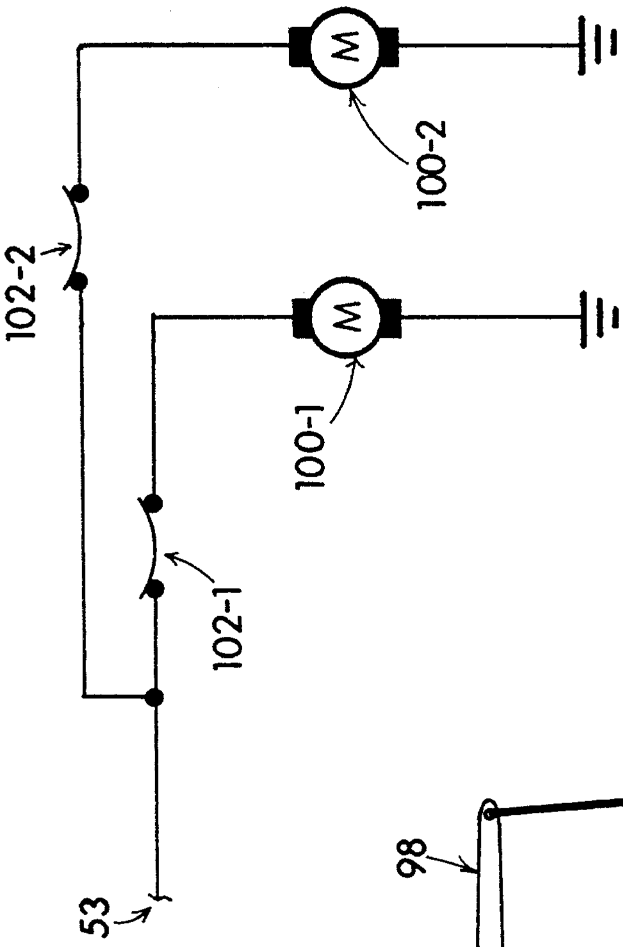
FIG. 7—Motor actuators for releasing child protection lock device in response to the egression signal.

The child protection lock may also be released by drive motors 100-1,100-2 as shown in FIG. 7. Operation of these motors is similar in principle to the operation of the LOCK/UNLOCK door lock motors 68-1,68-2 of earlier FIG. 1. Power applied to the line 53 from the circuit of FIG. 1 couples through the drive limit circuit breakers 102-1,102-2 and thence to the motors 100-1,100-2. It is anticipated that the drive associated with the motors 100-1,100-2 is unilateral in operation, that is to say it operates to UNLOCK the child protection lock device, whereas locking of the child protection lock device is preset by the manual control device 92-2 of FIG. 5.

Where the term motor vehicle is used this shall include at least automobiles, trucks, vans and tractors (as used with highway hauling trailers). Operator and driver are also synonymous terms.

A practicing artisan will realize that the advantages of my invention have been described in terms of certain embodiments and exemplified with respect thereto in order to give understanding of the essence of my invention's concept in tangible terms. Those persons skilled in the art to which my invention pertains will also readily appreciate and surely find that various modifications, adaptations, changes, omissions and substitutions may be made, not only in the structure as illustratively taught but also in the interface details relative with a particular type of motor vehicle, without departing from the obvious and essential spirit of my invention.

Moreover, the artisan will find that I teach my invention in the foregoing description for a combination of utilizations including automatic opening of windows, unlocking of doors and releasing child lock devices without delay subsequent to a sensed accident. However, the particulars of these teachings are for mere illustrative purposes. Use of my invention's principles, methods and apparatus are obviously of substantial import when used individually, as well as in combination. It is clearly the underlying purpose for my invention to urge enhanced passenger safety in event of a vehicular accident by providing at least some, if not all, of the safety features afforded by my invention.

Lastly, my invention is envisioned as most economically included within the structure of newly manufactured vehicles. However, this does not preclude beneficial use of my invention even when added to an existing vehicle as an aftermarket installation.

It is therefore fully contemplated by the inventor and to be clearly understood by others that the appended claims are intended to cover all such modifications and changes as fall within the true spirit and scope of my invention's essence.

What I claim is:

1. Method for enabling less encumbered access into and egress from a motor vehicle having electric window regulators subsequent to sensing an emergency condition usually resulting from collision between the motor vehicle and another object; establishing an emergency condition response to include immediate enablement of the electric window regulators for window opening; and, inhibiting the emergency condition response while the motor vehicle is parked or functionally inoperative.

2. Method of claim 1 including the step of inhibiting immediate enablement of the electric window regulators to thwart unauthorized entry into the vehicle which might otherwise be produced by bumping the motor vehicle when the vehicle's electrical system and ignition switch is in an OFF position concurrent with the emergency condition response.

3. Method of claim 1 including the immediate step of enabling automatic release and UNLOCKING of door lock devices subsequent to the establishment of the emergency condition response thereby enabling manual door latch release capability from inside and outside of the motor vehicle.

4. Method of claim 1 including the immediate step of automatically releasing child protection lock devices subsequent to the establishment of the emergency condition response, thereby enabling interior manual door latch release and an egress path for a passenger who may otherwise become entrapped within the motor vehicle.

5. Method of claim 1 including the steps of partitively overriding ignition lock-switch turn OFF and electrical lockup of the motor vehicle electrical system subsequent to the emergency condition response in order to maintain at least electric window regulator operation; and, limiting the overridiong of the electrical lockup of the motor vehicle to a predetermined period of time.

6. Method of claim 1 including the step of immediately enabling exterior manual operation of the electric window regulator operation subsequent to the establishment of the emergency condition response whereby the electric regulator controlled windows of the motor vehicle may be manually opened by a person outside of the motor vehicle by manipulation of the motor vehicle's exterior door latch handle devices.

7. Method for enabling less encumbered access into and egress from a motor vehicle subsequent to an emergency condition as usually resulting from a collision between the motor vehicle and another object; establishing an emergency state signal to enable immediate automatic unlocking of passenger door lock devices; and, inhibiting the emergency state signal while the motor vehicle is parked or functionally inoperative prior to the collision to thereby thwart unauthorized access to the motor vehicle by physically disturbing the vehicle.

8. Method of claim 7 including the step of utilizing the emergency state signal to enable immediate uninhibited operation of electric window regulators whereby an otherwise entrapped passenger seeking egress from the motor vehicle may readily open the motor vehicle windows.

9. Method of claim 7 including the step of utilizing the emergency state signal to enable immediate automatic electric window regulator operation and thereby open at least one motor vehicle window to enable a portal for access to and egress from the motor vehicle.

10. Method of claim 7 including the step of utilizing the emergency state signal to enable immediate release of locked child protection lock devices and enable manual interior door latch release and egress by a passenger who may otherwise become entrapped within the motor vehicle.

11. Method of claim 7 including the step of utilizing the emergency state signal to enable limited electric window regulator operation to enable window opening by a person outside of the motor vehicle by manipulation of the motor vehicle's exterior door latch handle devices.

12. Method of claim 7 including the steps of partitively overriding electrical lockup of the motor vehicle's electrical system produced by ignition switch turn-off following the collision thereby enabling unabated operational effect produced by the emergency state signal for a predetermined period of time.

13. Egression control apparatus for sensing an impact collision of a motor vehicle and enable immediate release of exit blockage devices which may otherwise interfere with passenger escape from the motor vehicle, comprising:

means for sensing a collision involving the motor vehicle and producing an emergency state signal;

means for enabling at least one of electrically opening a window means and electrically unlocking door means portions of the motor vehicle; and, means for determining a preexisting inoperative or parked motor vehicle state concurrent with the impact collision and if affirmative inhibiting the emergency state signal to thwart unauthorized access into the motor vehicle.

14. Egression control apparatus of claim 13 including:

lockout switch means for ordinarily allowing an operator of the motor vehicle to disable passenger position control of electric window regulator operation; and, lockout overriding means reinstating the passenger position control of the electric window regulator means in response to the emergency state signal.

15. Egression control apparatus of claim 13 including:

a passenger position electric window regulator means; and, operant means coupled with the electric window regulator means and responsive to the emergency state signal to enable immediate and substantially fully retracted automatic OPENING of an otherwise CLOSED window.

16. Egression control apparatus of claim 13 including:

a passenger position electric window regulator means;

disabling means usually controlled by the motor vehicle's operator whereby local window control operation by the passenger is denied; and, reenablement means responsive to the emergency state signal and producing local window control operation by the passenger.

17. Egression control apparatus of claim 13 including:

child protection lock means presettable to inhibit manual release of a usually rear seat position interior door latch; and, reenablement means responsive to the emergency state signal for effectively unlocking the child protection lock means thereby reinstating the manual release of the interior door latch.

18. Egression control apparatus of claim 13 including:

a door means LOCKED against exterior release;

unlocking means responsive to the emergency state signal for enabling UNLOCKING of the door means thereby allowing a person outside of the motor vehicle to unlatch and open the door means to provide immediate emergency access to an injured or disoriented passenger and to provide an exit means for egress or removal of the passenger from the motor vehicle.

19. Egression control apparatus of claim 13 including security means for inhibiting the emergency state signal when the motor vehicle's ignition switch is set in an effectively OFF position concurrent with the collision.

20. Egression control apparatus of claim 13 including:

ignition switch means; and, limited duration enablement means for maintaining at least the electric window regulator operation for a predetermined period of time subsequent to the post collision turn-OFF of the ignition switch means.

* * * * *